(12) United States Patent
Jung et al.

(10) Patent No.: US 12,463,432 B2
(45) Date of Patent: Nov. 4, 2025

(54) PV-ESS DIRECT CONNECTION TYPE ENERGY MANAGEMENT SYSTEM AND PHOTOVOLTAIC POWER GENERATION SYSTEM INTERWORKING DEVICE

(71) Applicant: LG ENERGY SOLUTION, LTD., Seoul (KR)

(72) Inventors: Inho Jung, Daejeon (KR); Jongcheol Kim, Daejeon (KR); Byeongho Mun, Daejeon (KR); Hyeungil Jo, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 0 days.

(21) Appl. No.: 18/564,905

(22) PCT Filed: Jan. 13, 2023

(86) PCT No.: PCT/KR2023/000655
§ 371 (c)(1),
(2) Date: Nov. 28, 2023

(87) PCT Pub. No.: WO2023/146176
PCT Pub. Date: Aug. 3, 2023

(65) Prior Publication Data
US 2024/0275171 A1    Aug. 15, 2024

(30) Foreign Application Priority Data
Jan. 26, 2022 (KR) .................. 10-2022-0011267
Jan. 11, 2023 (KR) .................. 10-2023-0003808

(51) Int. Cl.
*H02J 3/38* (2006.01)
*H02J 3/32* (2006.01)
(Continued)

(52) U.S. Cl.
CPC ............. *H02J 3/381* (2013.01); *H02J 3/32* (2013.01); *H02S 50/00* (2013.01); *H02J 7/35* (2013.01); *H02J 2300/26* (2020.01); *Y02E 10/56* (2013.01)

(58) Field of Classification Search
CPC ...... H02J 3/32; H02J 3/381; H02J 7/35; H02J 2300/24–26; Y02E 10/56; H02S 40/30–38; H02S 50/00
See application file for complete search history.

(56) References Cited

U.S. PATENT DOCUMENTS 8,994,217 B2   3/2015  Cho et al.
10,404,072 B2  9/2019  Palombini et al.
(Continued)

FOREIGN PATENT DOCUMENTS

CN    104836321 B      11/2017
CN    108039852 A  *   5/2018  .............. F25B 30/02
(Continued)

OTHER PUBLICATIONS

English machine translation of JP2020115747A published Jul. 30, 2020 (Year: 2020).*
(Continued)

*Primary Examiner* — Rexford N Barnie
*Assistant Examiner* — David A Shiao
(74) *Attorney, Agent, or Firm* — Birch, Stewart, Kolasch & Birch, LLP

(57) ABSTRACT

Discussed is a photovoltaic (PV) recombining apparatus configured to connect a photovoltaic (PV) system with a Direct Current (DC) bus connected to Direct Current (DC) power lines of an energy storage system (ESS) and an inverter (PCS). The PV recombination apparatus can include an inverter connection terminal connecting the photovoltaic system and the inverter, an ESS connection terminal con-
(Continued)

necting the photovoltaic system and the energy storage system, and a disconnector configured to disconnect the photovoltaic system and the DC bus according to a control command which is based on external conditions.

15 Claims, 5 Drawing Sheets

(51) Int. Cl.
*H02S 50/00* (2014.01)
*H02J 7/35* (2006.01)

(56) References Cited

U.S. PATENT DOCUMENTS

| | | | |
|---|---|---|---|
| 2003/0075211 | A1 | 4/2003 | Makita et al. |
| 2017/0047740 | A1 | 2/2017 | Narla |
| 2017/0353155 | A1* | 12/2017 | Hackl ............... H02S 50/00 |
| 2019/0334349 | A1* | 10/2019 | Liu ..................... H02J 3/32 |

FOREIGN PATENT DOCUMENTS

| | | | | |
|---|---|---|---|---|
| CN | 109768570 | A | * | 5/2019 |
| CN | 113794263 | A | * | 12/2021 |
| CN | 215185883 | U | * | 12/2021 |
| EP | 1 291 997 | A2 | | 3/2003 |
| JP | 2003-158282 | A | | 5/2003 |
| JP | 2014-229818 | A | | 12/2014 |
| JP | 2018-19577 | A | | 2/2018 |
| JP | 2019-71749 | A | | 5/2019 |
| JP | 2019-122182 | A | | 7/2019 |
| JP | 2019-213390 | A | | 12/2019 |
| JP | 2020-115747 | A | | 7/2020 |
| KR | 10-2011-0133809 | A | | 12/2011 |
| KR | 10-2013-0051772 | A | | 5/2013 |
| KR | 10-2014-0068560 | A | | 6/2014 |
| KR | 10-1533337 | B1 | | 7/2015 |
| KR | 10-2017-0038640 | A | | 4/2017 |
| KR | 10-1849664 | B1 | | 4/2018 |
| KR | 10-2018-0090673 | A | | 8/2018 |
| KR | 10-1929249 | B1 | | 12/2018 |
| KR | 10-2019-0031475 | A | | 3/2019 |
| KR | 10-2110140 | B1 | | 5/2020 |
| KR | 10-2020-0062492 | A | | 6/2020 |
| KR | 10-2020-0069122 | A | | 6/2020 |
| KR | 10-2020-0083794 | A | | 7/2020 |
| WO | WO-2013005804 | A1 | * | 1/2013 ............ H01M 10/44 |

OTHER PUBLICATIONS

English machine translation of CN108039852A published May 15, 2018 (Year: 2018).*
English machine translation of CN109768570A published May 17, 2019 (Year: 2019).*
English machine translation of CN113794263A published Dec. 14, 2021 (Year: 2021).*
English machine translation of CN215185883U published Dec. 14, 2021 (Year: 2021).*
English machine translation of WO2013005804A1 published Jan. 10, 2013 (Year: 2013).*
International Search Report (PCT/ISA/210) issued in PCT/KR2023/000655 mailed on May 3, 2023.
Extended European Search Report for European Patent Application No. 23 74 7218, dated Dec. 11, 2024.
Japanese Office Action for Japanese Application No. 2023-577229, dated Oct. 21, 2024, with English translation.
Japanese Office Action for Japanese Application No. 2023-577229, dated Mar. 25, 2025, with English translation.

* cited by examiner

[Figure 1]
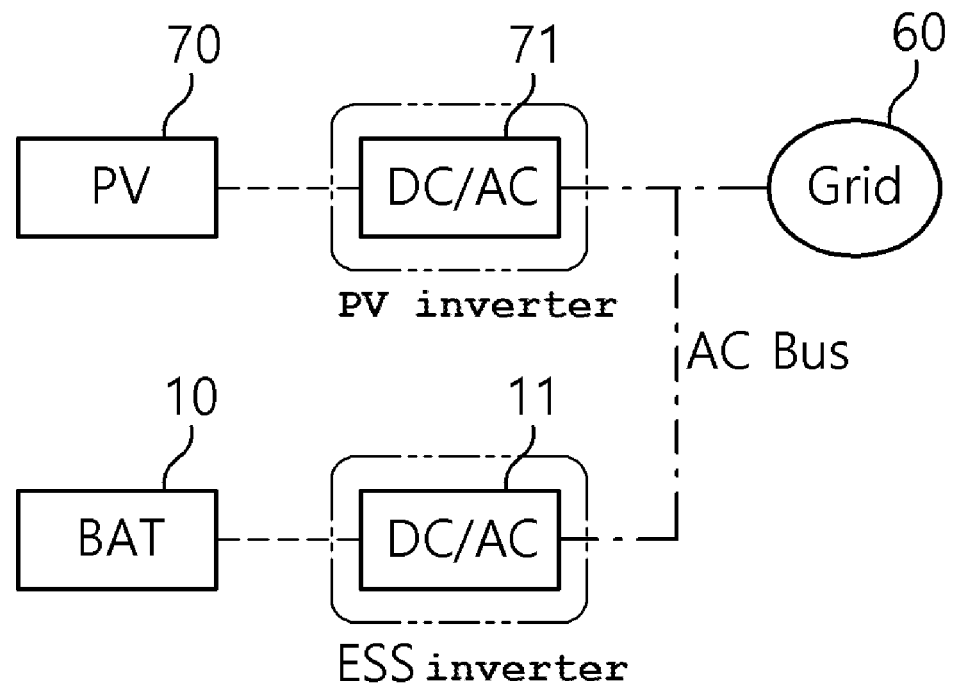

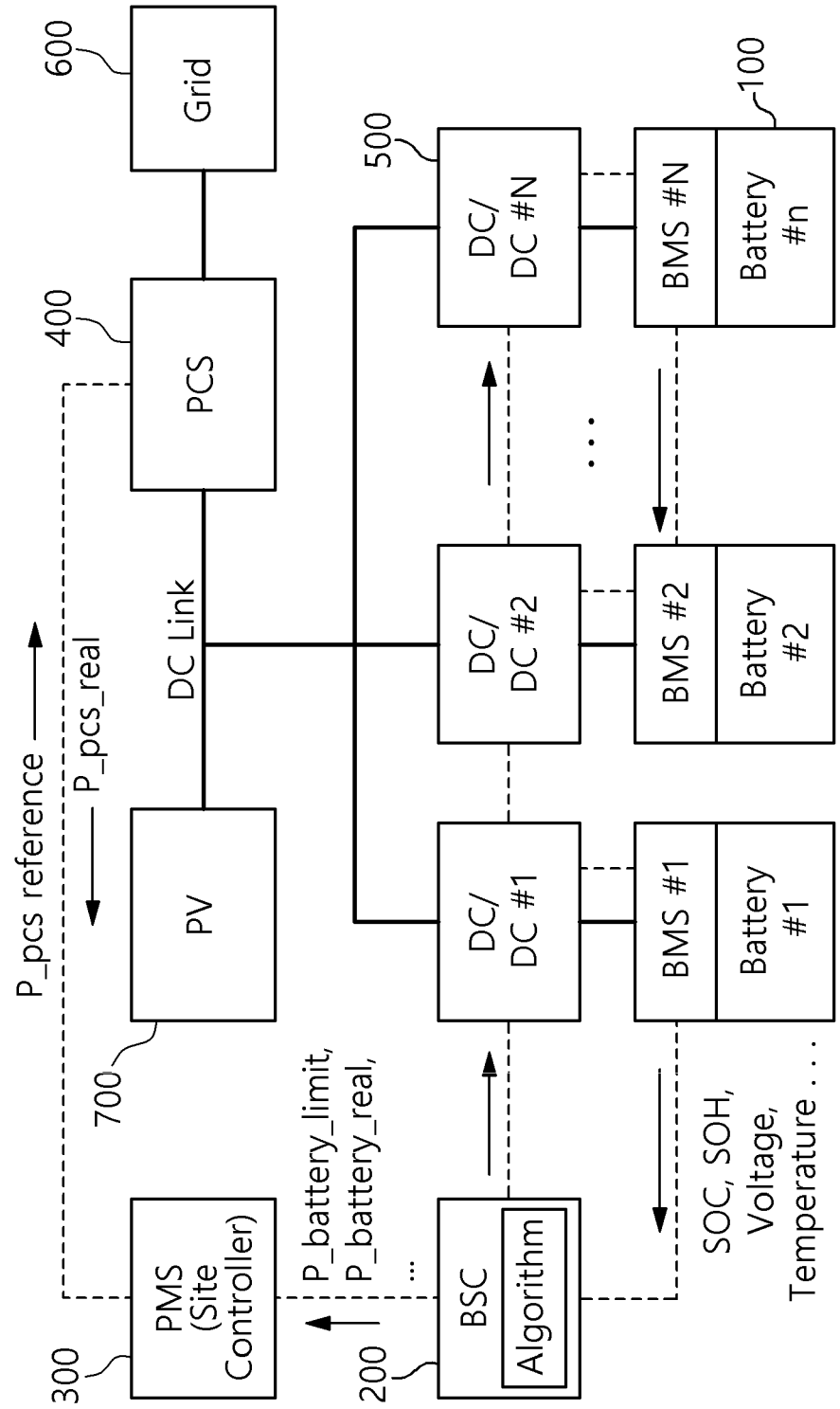
[Figure 2]

[Figure 3]
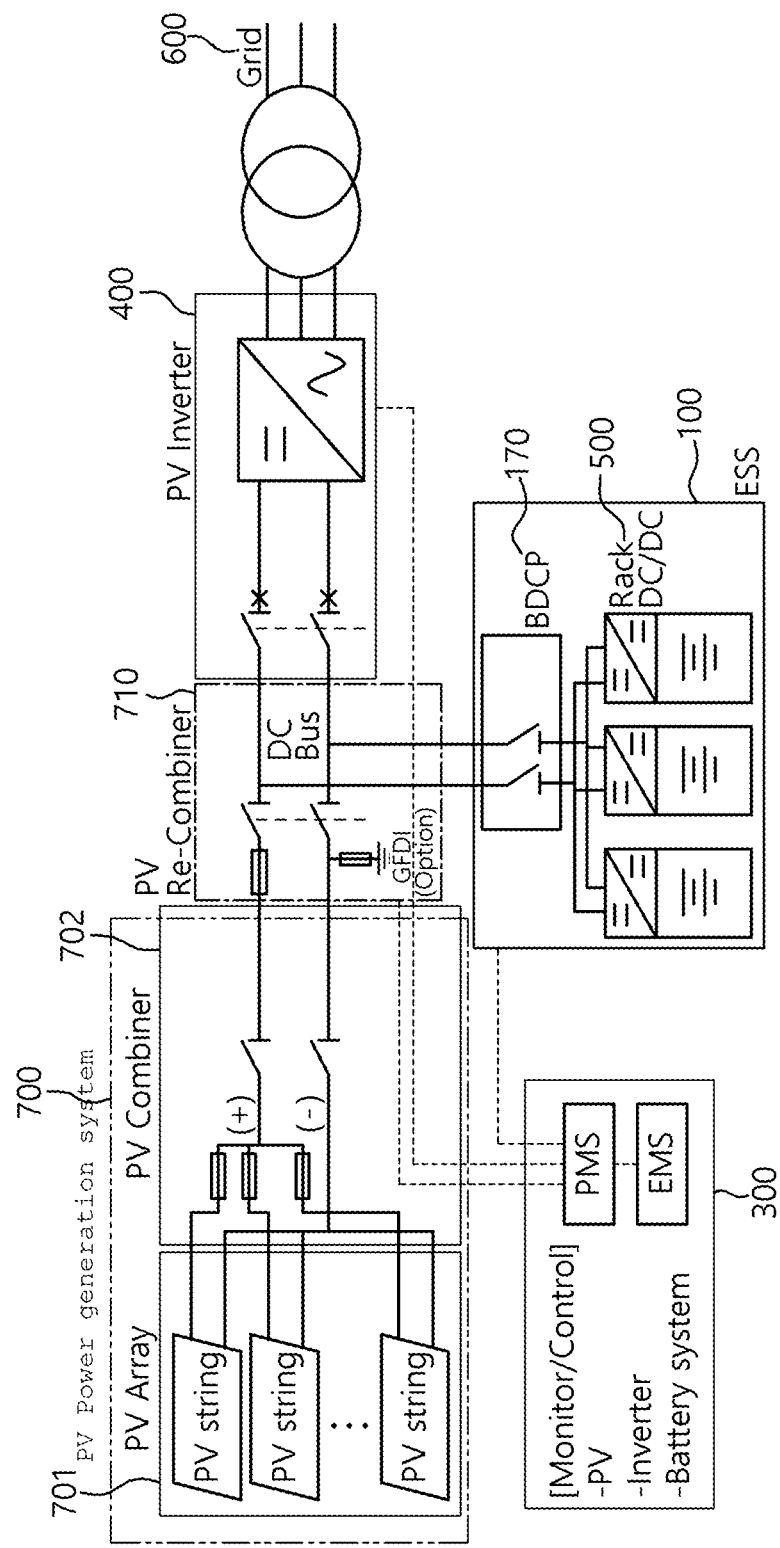

[Figure 4]

|  | Day | Night |
|---|---|---|
| PV Re-combiner | ON | OFF |
| ESS | Charge (CP mode) | Discharge (CV mode) |
| PV Inverter | Supply Power (MPPT) | CP Power Supply (CP mode) |
| GFDI | Always monitoring PV ground fault | |
| IMD | OFF | monitoring insulation state of DC bus (ESS+Inverter) |

[Figure 5]
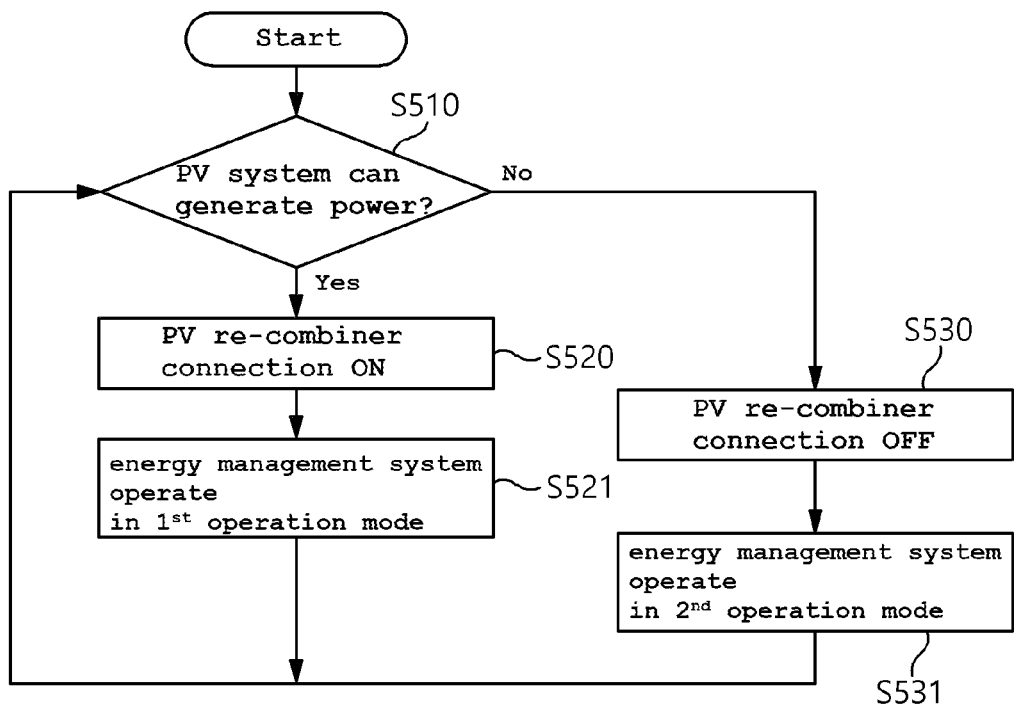

PV-ESS DIRECT CONNECTION TYPE ENERGY MANAGEMENT SYSTEM AND PHOTOVOLTAIC POWER GENERATION SYSTEM INTERWORKING DEVICE

TECHNICAL FIELD

This application claims priority to and the benefit of Korean Patent Application No. 10-2022-0011267 filed in the Korean Intellectual Property Office on Jan. 26, 2022 and Korean Patent Application No. 10-2023-0003808 filed in the Korean Intellectual Property Office on Jan. 11, 2023, the entire contents of which are incorporated herein by reference.

The present invention relates to a PV recombining apparatus, an energy management system including the same, and a control method of an energy management system, and more particularly, to a PV recombining apparatus for disconnecting a PV system from a battery system according to external conditions, an energy management system including the PV recombining apparatus, and a control method of an energy management system.

BACKGROUND ART

An energy storage system relates to various technologies, including renewable energy, a battery that stores electric power, and a power grid. Recently, as supply of smart grid and renewable energy is expanding, and efficiency and stability of power systems are emphasized, a demand for energy storage systems for power supply and demand control and power quality improvement is increasing. Depending on a purpose of use, energy storage systems may have different output and capacity. In order to configure a large-capacity energy storage system, a plurality of battery systems may be connected to provide the large-capacity energy storage system.

The energy storage system generates and stores power in a form of direct current (DC) voltage and, when the energy storage system is connected to a photovoltaic (PV) system so as to interwork with the power grid, an AC coupling system in which the energy storage system and the photovoltaic system are connected in an alternative current (AC) system through an inverter has been commonly used.

Recently, for the purpose of maximizing photovoltaic power generation efficiency and reducing installation costs by minimizing a number of inverters, it is expected that a number of systems (DC-coupling systems) in which a photovoltaic system and an energy storage system are coupled in a DC distribution system will increase. In the DC-coupling system, in which the PV system and ESS are connected to a DC bus in common, system errors due to a conflict between MPPT control of sunlight and ESS voltage control, reduced power efficiency due to partial discharge due to PV connection during power supply from ESS to the power grid during the night time, and increased system risk due to fault current inflow may follow. Therefore, a proper method for directly connecting the PV system and the ESS to the DC bus is required.

DETAILED DESCRIPTION OF THE INVENTION

Technical Problem

To obviate one or more problems of the related art, embodiments of the present disclosure provide a PV recombining apparatus.

To obviate one or more problems of the related art, embodiments of the present disclosure also provide an energy management system including the PV recombining apparatus.

To obviate one or more problems of the related art, embodiments of the present disclosure also provide a control method of an energy management system.

Technical Solution

In order to achieve the objective of the present disclosure, a photovoltaic (PV) recombining apparatus, configured to connect a photovoltaic (PV) system with a direct current (DC) bus connected to DC power lines of an energy storage system (ESS) and an inverter (PCS), may include: an inverter connection terminal connecting the photovoltaic system and the inverter; an ESS connection terminal connecting the photovoltaic system and the energy storage system; and a disconnector configured to disconnect the photovoltaic system and the DC bus according to a control command which is based on external conditions.

The disconnector may operate by receiving the control command which is based on the external conditions from a power management control device.

The PV recombining apparatus may further include: a current monitoring device configured to measure an amount of power generated by the photovoltaic system; and a ground fault detector configured to detect a ground fault in the photovoltaic system.

The ESS connection terminal may be connected to a battery DC Panel (BDCP) of the energy storage system.

The external conditions may include one or more of time conditions and weather conditions related to availability of photovoltaic power generation.

More specifically, the external conditions may include whether an operating time zone of the photovoltaic system is daytime or nighttime.

The disconnector may disconnect the photovoltaic system and the DC bus at night time.

According to another embodiment of the present disclosure, an energy management system may include a power management control device interworking with an energy storage system (ESS) and a photovoltaic (PV) system associated therewith and configured to determine whether the photovoltaic (PV) system is able to generate power based on external conditions; and a PV re-combiner configured to disconnect the photovoltaic system from a direct current (DC) bus which is connected to direct current (DC) power lines of the energy storage system and an inverter (PCS) according to a control command from the power management control device.

The PV re-combiner may include an inverter connection terminal connecting the photovoltaic system and the inverter; an ESS connection terminal connecting the photovoltaic system and the energy storage system; and a disconnector configured to disconnect the photovoltaic system and the DC bus according to the control command of the power management control device which is based on external conditions.

The PV re-combiner may further include: a current monitoring device configured to measure an amount of power generated by the photovoltaic system; and a ground fault detector configured to detect a ground fault in the photovoltaic system.

The ESS connection terminal may be connected to a battery DC Panel (BDCP) of the energy storage system.

The external conditions may include one or more of time conditions and weather conditions related to availability of photovoltaic power generation.

More specifically, the external conditions may include whether an operating time zone of the photovoltaic system is daytime or nighttime.

The disconnector may disconnect the photovoltaic system and the DC bus at night time.

The photovoltaic system and the DC bus may be connected in an instance that photovoltaic power generation is possible so that the energy management system operates in a first operation mode and the photovoltaic system and the DC bus is disconnected in an instance that photovoltaic power generation is impossible so that the energy management system operates in a second operation mode.

In the first operation mode, the inverter may supply power according to maximum power point tracking (MPPT) control and the energy storage system performs charging in a constant power (CP) mode.

In the second operation mode, the energy storage system may perform discharging in a constant voltage (CV) mode and the inverter supplies power in a constant power (CP) mode.

According to another embodiment of the present disclosure, a control method of an energy management system including an energy storage system (ESS) and a photovoltaic (PV) system associated therewith may include: determining whether the photovoltaic (PV) system is possible to generate power, based on external conditions; and connecting or disconnecting the photovoltaic system and a direct current (DC) bus according to a determination result of the determining using a PV re-combiner which is located between the DC bus and the photovoltaic (PV) system, wherein the DC bus is connected to DC power lines of an energy storage system and an inverter (PCS).

The connecting or disconnecting the photovoltaic system and the DC bus may include connecting the photovoltaic system and the DC bus in an instance that photovoltaic power generation is possible so that the energy management system operates in a first operation mode.

The connecting or disconnecting the photovoltaic system and the DC bus may include disconnecting the photovoltaic system and the DC bus in an instance that photovoltaic power generation is impossible so that the energy management system operates in a second operation mode.

In the first operation mode, the inverter may supply power according to maximum power point tracking (MPPT) control and the energy storage system performs charging in a constant power (CP) mode.

In the second operation mode, the energy storage system may perform discharging in a constant voltage (CV) mode and the inverter supplies power in a constant power (CP) mode.

Advantageous Effects

According to embodiments of the present disclosure, it is possible to improve power generation efficiency and reduce installation costs through establishing a PV-ESS direct-coupled DC power distribution system.

In addition, it is possible to prevent an inflow of fault current and decrease in power efficiency by monitoring a ground fault in a PV system during PV power generation and by separating the PV system from the ESS during non-power generation through the PV recombining apparatus.

Accordingly, operations of an energy management system including a photovoltaic system and a battery system can be optimized.

BRIEF DESCRIPTION OF THE DRAWINGS

FIG. 1 is a block diagram of an AC-coupling photovoltaic (PV)-ESS connection system.

FIG. 2 is a block diagram of an example of a DC-coupling photovoltaic (PV)-ESS connection to which the present invention may be applied.

FIG. 3 is a connection relationship diagram between each system in a DC-coupling photovoltaic-ESS connection system according to embodiments of the present invention.

FIG. 4 is a table showing a method of operating a DC-coupling photovoltaic-ESS connection system based on external conditions according to embodiments of the present invention.

FIG. 5 is an operational flowchart of a control method of an energy management system according to embodiments of the present invention.

100: Energy storage system (ESS)
400: PCS/inverter
500: DC/DC converter
600: Power Grid
700: Photovoltaic (PV) system
710: PV re-combiner

BEST MODE

The present invention may be modified in various forms and have various embodiments, and specific embodiments thereof are shown by way of example in the drawings and will be described in detail below. It should be understood, however, that there is no intent to limit the present invention to the specific embodiments, but on the contrary, the present invention is to cover all modifications, equivalents, and alternatives falling within the spirit and technical scope of the present invention. Like reference numerals refer to like elements throughout the description of the figures.

It will be understood that, although the terms such as first, second, A, B, and the like may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes combinations of a plurality of associated listed items or any of the plurality of associated listed items.

It will be understood that when an element is referred to as being "coupled" or "connected" to another element, it can be directly coupled or connected to the other element or an intervening element may be present. In contrast, when an element is referred to as being "directly coupled" or "directly connected" to another element, there is no intervening element present.

The terms used herein is for the purpose of describing specific embodiments only and are not intended to limit the present invention. As used herein, the singular forms "a", "an" and "the" are intended to include the plural forms as well, unless the context clearly indicates otherwise. It will be further understood that the terms "comprises", "comprising", "includes", "including" and/or "having", when used herein, specify the presence of stated features, integers, steps, operations, constitutional elements, components and/or combinations thereof, but do not preclude the presence or addition of one or more other features, integers, steps, operations, constitutional elements, components, and/or combinations thereof.

Unless otherwise defined, all terms used herein, including technical and scientific terms, have the same meanings as commonly understood by one skilled in the art to which the present invention belongs. It will be further understood that terms, such as those defined in commonly used dictionaries, should be interpreted as having meanings that are consistent with their meanings in the context of the relevant art and will not be interpreted in an idealized or overly formal sense unless expressly so defined herein.

Some terms used herein are defined as follows.

State of Charge (SOC) refers to a current state of charge of a battery, represented in percent points [%], and State of Health (SOH) may be a current condition of a battery compared to its ideal or original conditions, represented in percent points [%].

A battery rack refers to a system of a minimum single structure assembled by connecting packs (or modules) set by a battery manufacturer in series/parallel, which can be monitored and controlled by a battery management system (BMS). A battery rack may include several battery packs (or modules) and a battery protection unit or any other protection device.

A battery bank refers to a group of large-scale battery rack systems configured by connecting several racks in parallel. A bank BMS for a battery bank may monitor and control several rack BMSs, each of which manages a battery rack.

A battery section controller (BSC) refers to a device that controls the topmost level of a battery system including a battery bank level structure or a multiple bank level structure.

A power limit refers to a limit of power that can be output from a battery, which is set in advance by a battery manufacturer based on a battery condition. A rack power limit may mean an output power limit ([kw]) set for a rack level, and can be set based on a SOC and a temperature of the battery.

The power limit can be a charge power limit or a discharge power limit depending on whether charging or discharging is applied. In addition, according to a battery system structure, a rack power limit or a bank power limit may be defined.

Hereinafter, exemplary embodiments of the present invention will be described in detail with reference to the accompanying drawings.

FIG. 1 is a block diagram of an AC-coupling photovoltaic (PV)-ESS connection system.

Referring to FIG. 1, the AC-coupling photovoltaic-ESS connected system may be implemented as a form in which a PV system having a photovoltaic (PV) 70 and a battery system (or ESS) having a battery (BAT) 10 are coupled to an AC bus through a photovoltaic (PV) inverter 71 and an ESS inverter 11, respectively, thereby interconnecting with a power grid 60.

The PV inverter may receive commands from a PMS (Power Management System) to form a voltage that can maximize PV power generation efficiency and generate power and supplies energy stored in the battery to the power grid as needed during nighttime.

Somehow, recently, a DC-coupling system, which is in contrast to the AC-coupling photovoltaic-ESS connected system, has been in increasing demand due to advantages such as maximization of photovoltaic power generation efficiency and reduction of installation cost through minimization of the number of inverters.

FIG. 2 is a block diagram of an example of a DC-coupling photovoltaic (PV)-ESS connection to which the present invention may be applied.

In a DC-coupled photovoltaic (PV)-ESS connection system, a DC/DC converter 500 capable of individually controlling DC voltage/current for each battery system 100 is needed. Since a DC/DC converter is placed in the battery system, a DC/AC converter used for connecting with a photovoltaic system is no longer needed, thereby increasing efficiency. In addition, protection control of the battery system is possible through a DC/DC converter for each battery system, as in an existing battery system. Furthermore, it is possible to control amount of battery power based on characteristics of individual battery systems even when battery racks have differences in SOC, SOH, and capacity.

FIG. 2 shows an example of a DC coupled system in which an output terminal of a photovoltaic (PV) 700 is connected to an output terminal of a DC/DC converter 500 and an input terminal of a PCS 400.

In an energy storage system (ESS), a battery is used for storing energy or power. Typically, multiple battery packs (or modules) may form a battery rack and multiple battery racks form a battery bank. Here, depending on a device or a system in which the battery is used, a battery rack may be referred to as a battery pack. Battery #1, battery #2, . . . , and battery #N shown in FIG. 2 may be a battery rack or a battery pack.

Here, a battery management system (BMS) 100 may be installed for each battery. The BMS 100 may monitor a current, a voltage and a temperature of each battery rack to be managed, calculate a State Of Charge (SOC) of the battery based on a monitoring result to control charging and discharging. In the system of FIG. 2, in case that each battery is a battery rack, the BMS may be a rack BMS (RBMS).

A battery section controller (BSC) 200 may be located in each battery section which includes a plurality of batteries, peripheral circuits, and devices to monitor and control objects such as a voltage, a current, a temperature, and a circuit breaker.

A power conversion/conditioning system (PCS) 400 installed in each battery section may control power supplied from the outside and power supplied from the battery section to the outside, thereby controlling charging and discharging of the battery, and the power conversion system may include a DC/AC inverter. The PCS 400 may be understood to be synonymous with a component referred to as an inverter or a PV inverter elsewhere in this specification.

Furthermore, the output of the DC/DC converter 500 may be connected to the PCS 400 and the PCS 400 may be connected to the power grid 600. Here, the PCS 400 typically operates in a constant power mode. A power management system (PMS) 300 connected to the PCS may control the output of the PCS based on the monitoring and control results of the battery management system or the battery section controller.

In the energy storage system of FIG. 2, battery #1 is connected to DC/DC converter #1, battery #2 is connected to DC/DC converter #2, and battery #N is connected to DC/DC #N. The output of the DC/DC converter corresponding to each battery is connected to the PCS 400 through a DC link.

The DC/DC converter may be a bidirectional converter, wherein when conversion is performed from the battery to the load direction, the input of the DC/DC converter is connected to a battery (a battery unit, a battery rack or a battery pack) and the output of the DC/DC converter may be connected to a load. As examples of the DC/DC converter, various types of converters such as a full-bridge converter, a half-bridge converter, and a flyback converter may be used.

Meanwhile, communication among the BMS, the BSC 200, the PMS 300, and the PCS 400 may be implemented through a controller area network (CAN) or Ethernet (indicated by a dotted line in FIG. 2).

According to the embodiment of the present invention shown in FIG. 2, the BSC 200 in charge of overall control of the battery area may report a state of each battery to the PMS 300. Here, the state of each battery may include information such as a state of charge (SOC), a state of health (SOH), a voltage, and a temperature of each battery. The BSC 200 may provide information such as limit power (P_battery_limit) and real power (P_battery_real) of each battery to the power management system 300. The power management system 300 in charge of controlling the entire ESS system may issues a charge command or a discharge command (via P_pcs_reference) to the power conversion system 400 during system operation.

Here, the BSC 200 determines an output reference for each DC/DC converter based on a state of each battery. In an embodiment according to the present invention, an output reference of an individual DC/DC converter may be set in different ways according to a droop mode or a constant power (CP) mode.

When the output of the DC/DC converter is controlled according to the droop mode, the BSC may set a droop curve for each DC/DC converter in consideration of the state of each battery before operating the system and provide the set droop curve to the converter. Meanwhile, when the DC/DC converter operates in the CP mode, a power reference of each DC/DC converter may be determined during system operation and provided to a corresponding converter.

During actual operation of the energy storage system, the power management system delivers charge/discharge commands to the power conversion system and the battery section controller. Here, the power management system may monitor states of the photovoltaic system (PV), the grid, and the battery in real time, and decide operation modes and output references of respective components in the system based on operation commands received from an upper system, e.g. EMS (Energy Management System).

The DC coupling system may store surplus power in the ESS when the PV power generation exceeds the capacity of the solar inverter. This is called energy recapture and has an effect of maximizing an amount of solar power generation.

FIG. 3 is a connection relationship diagram between each system in a DC-coupling photovoltaic-ESS connection system according to embodiments of the present invention.

FIG. 3 shows a system configuration focusing on hardware components necessary to actually implement connection between a photovoltaic system 700 and an energy storage system 100 when the photovoltaic system 700 and the energy storage system 100 are connected with the power grid 600 through DC coupling.

Referring to FIG. 3, the photovoltaic system 700 includes a PV array 701 in which PV strings are connected in parallel and a PV combiner 702 which is implemented as a distribution board for connecting a plurality of positive terminals of the PV strings in the PV array into one, and connecting a plurality of negative terminals into one. The switch connecting the positive terminals and the switch connecting the negative terminals in the PV combiner 702 are maintained always connected except for operational needs such as failure or inspection.

Each PV string may include a plurality of PV panels connected in series to form a DC bus voltage of 1000V to 1500V. The photovoltaic system 700 generally forms a maximum voltage of 1000V to 1500 Vdc and, for a large-capacity power generation system, it is possible to reduce installation costs such as cable price reduction by increasing an output voltage while using a low current capacity compared to a same power.

The energy storage system 100 may be configured using various energy sources as an energy storage device, but in this embodiment, a secondary battery will be described as an energy source. In case of a battery system, a voltage of 1000V to 1500 Vdc may be formed by configuring a battery rack by connecting a plurality of battery packs in series as described above with reference to FIG. 2.

In this DC power distribution system, the solar inverter may adjust the voltage of the DC bus by performing Maximum Power Point Tracking (MPPT) control according to a power generation state of the PV. Here, if the PV system is directly connected to the battery, it is difficult to adjust the DC bus voltage. Therefore, in the DC coupling system, a separate DC/DC converter is required in the ESS (i.e., a battery system).

Here, Maximum Power Point Tracking (MPPT) control is a form of control that allows maximum power to be obtained by appropriately adjusting a load according to external circumstances. A point at which maximum power is delivered is referred to as a maximum power operating point, and the maximum power operating point may be changed according to external conditions such as solar radiation and temperatures.

Somehow, in FIGS. 2 and 3, a system in which a separate DC/DC converter is applied to each battery rack is exemplified, but the present invention may also applied to a system in which a central DC/DC converter is commonly connected to a plurality of battery racks. The DC/DC converters for respective battery racks has an advantage of allowing individual control according to a state of each battery rack whereas the system may be complicated and the central DC/DC converter has an advantage of a simple system configuration with requirement of fewer facility.

The PV re-combiner 710 may serve as a switchboard for physically connecting the photovoltaic system and the energy storage system. The PV re-combiner 710 may include a remote disconnector, a PV inverter connection terminal, and an ESS connection terminal. The PV re-combiner may be understood as the same component as a PV connection apparatus or a PV connection device mentioned elsewhere in this specification.

The PV re-combiner may separate the photovoltaic system from the DC bus by using a remote disconnector for example, during night time, to prevent a decrease in power generation efficiency. Even when the photovoltaic system is not generating power, a voltage may be applied to the DC bus connected to the ESS and, when a voltage is applied to the photovoltaic system during no-power generation of the photovoltaic system, a reverse current which has an opposite direction to a power generation direction may be generated. This may cause a decrease in power generation efficiency as if continuous discharge occurring in the battery system. Therefore, according to embodiments of the present invention, the PV system is separated from the DC bus at night time when the photovoltaic system does not generate power, thereby increasing ESS power generation efficiency.

Here, the remote disconnector may be implemented as a motorized disconnector.

The PV re-combiner 710 may further include a fuse, a ground fault detection interrupter (GFDI) for preventing a ground fault, a current monitor for checking an amount of PV power generation, and an IO (Input Output) port.

A GFDI is a device connected between a power line and the ground, and may cut off a current when the current flowing from the power line to the ground exceeds a certain reference value. Here, as a device for detecting a ground fault, in addition to the GFDI, an IMD (Insulation Monitoring Device), a RCM (Residential Current Monitoring), and the like may be used. An IMD is a device that measures and monitors an insulation resistance value between a positive terminal and the ground, and between a negative terminal and the ground. The RCM is a device that detects leakage current by monitoring whether a sum of currents flowing through each of the positive power line and the negative power line is zero.

Another role of the PV re-combiner is to prevent inflow of fault current. Since the photovoltaic system and the energy storage system are connected without any separating device, fault current may flow in the event of a ground fault. Therefore, in the present invention, it is possible to prevent the inflow of fault current and achieve optimization of ground fault monitoring by monitoring a ground fault of the photovoltaic system during power generation and by separating the photovoltaic system from other systems during non-power generation through the PV re-combiner.

Here, a subject of controlling operations of the PV re-combiner (710), the PV inverter (400), and the energy storage system (100) may a power management control device or energy management device (PMS/EMS) (300).

According to an embodiment, when the PV system and the DC bus are connected through the PV re-combiner 710 under control of the power management control device, the entire energy management system may operate in a first operation mode. In a first operation mode, the PV inverter may supply power according to the MPPT algorithm. Since it is a period in which photovoltaic power generation is performed, the ESS 100 may be in a charging state. Here, the ESS may operate in a constant power (CP) mode. The GFDI included in the PV re-combiner 710 may constantly monitor a ground fault in the PV system.

According to another embodiment, when the connection between the PV system and the DC bus is disconnected through the PV re-combiner 710 under control of the power management control device, the entire energy management system may operate in a second operation mode. In the second operating mode, the ESS 100 may discharge in a constant voltage (CV) mode and the PV inverter may supply power in a constant power (CP) mode. Here, the GFDI may monitor the PV system for ground faults. Meanwhile, an IMD disposed on the DC bus may be activated to monitor insulation state of the DC bus (ESS and PV inverter) at night.

Meanwhile, the DC/DC converter 500 may be connected to the PV re-combiner 710 through a Battery DC Panel (BDCP) 170.

In FIG. 3, EMS is presented as an entity that manages the entire system in conjunction with the PMS, but the energy management system described in this specification may refer to a system concept which is connected with an energy storage system (ESS) and a photovoltaic (PV) system and include a power management control device (PMS) that checks whether the photovoltaic (PV) system is able to generate power based on external conditions and a PV re-combiner configured to disconnect the photovoltaic system from a DC bus which is connected to DC power lines of the energy storage system and an inverter (PCS) according to a control command from the power management control device, and may further refer to a system for managing energy, the system including all components shown in FIG. 3.

FIG. 4 is a table showing a method of operating a DC-coupling photovoltaic-ESS connection system based on external conditions according to embodiments of the present invention.

In the embodiment of FIG. 4, the operation method is described by distinguishing temporal conditions, that is, day and night, as external conditions. However, the external conditions may include not only temporal conditions, but also weather conditions. In other words, the operation method according to the night of the present embodiment can be applied even in conditions in which sunlight cannot be expected for a long time, such as, during a rainy season.

First, during the daytime when sufficient sunlight required for power generation can be expected, the PV re-combiner 710 maintains a connection state between the PV system and the DC bus to be ON. The PV inverter supplies power according to MPPT control. Since it is a period in which photovoltaic power generation is performed, the ESS 100 may be charging. Here, the ESS may operate in a constant power (CP) mode. The GFDI included in the PV re-combiner 710 may constantly monitor a ground fault of the PV system.

On the other hand, during the nighttime when photovoltaic generation cannot be performed, the PV re-combiner 710 may disconnect the PV system from the DC bus. The ESS 100 may discharge in a constant voltage (CV) mode and the PV inverter may supply power in a constant power (CP) mode. Here, the GFDI may monitor the PV system for ground faults.

Meanwhile, the system according to the present invention may further include an insulation monitoring Device (IMD), which is disposed on the DC bus may be activated to monitor insulation state of the DC bus (ESS and PV inverter) at night. The IMD may operate as off during the daytime.

FIG. 5 is an operational flowchart of a control method of an energy management system according to embodiments of the present invention.

The control method of the energy management system according to the present invention may be performed by a control device that interworks with an energy storage system (ESS) and a photovoltaic (PV) system associated therewith. The control device may determine whether the photovoltaic (PV) system can generate power based on external conditions (S510).

Here, the external conditions may include one or more of time conditions and weather conditions related to whether photovoltaic power generation is possible.

According to the determination result, the connection between the photovoltaic (PV) system and the DC bus may be maintained (S520) or disconnected (S530) using a PV re-combiner which is located between the photovoltaic (PV) system and the DC bus that is connected to DC power lines of an energy storage system (ESS) and an inverter (PCS).

In other words, for example, during the daytime when sufficient sunlight required for power generation can be expected, the PV re-combiner 710 maintains the connection state between the PV system and the DC bus to be ON. In contrast, during the night when photovoltaic generation is impossible, the PV system and the DC bus are disconnected by the PV re-combiner.

When the PV system and the DC bus are connected, the entire energy management system may operate in a first operation mode (S521). In the first operation mode, the PV inverter supplies power according to the MPPT algorithm. Since it is a period in which photovoltaic power generation is performed, the ESS 100 may be in a charging state. Here, the ESS may operate in a constant power (CP) mode. A GFDI included in the PV re-combiner 710 may constantly monitor a ground fault of the PV system.

Meanwhile, when the connection between the PV system and the DC bus is disconnected, the entire energy management system may operate in a second operation mode (S531). In the second operation mode, the ESS 100 may discharge using a constant voltage (CV) mode and the PV inverter may supply power using a constant power (CP) mode. Here, the GFDI may also monitor the PV system for ground faults. Meanwhile, an IMD disposed on the DC bus may be activated to monitor insulation state of the DC bus (ESS and PV inverter) at nighttime.

According to the embodiments of the present invention as described above, a ground fault of the PV system can be monitored during photovoltaic power generation through the PV re-combiner and the PV system is separated from the ESS during non-power generation, thereby optimizing fault current inflow and ground fault monitoring.

The operations of the method according to the embodiments of the present invention may be implemented as a computer-readable program or code on a computer-readable recording medium. The computer-readable recording medium includes all types of recording devices in which data readable by a computer system is stored. In addition, the computer-readable recording medium may be distributed in a network-connected computer system to store and execute computer-readable programs or codes in a distributed manner.

Although some aspects of the invention have been described in the context of the apparatus, it may also represent a description according to a corresponding method, wherein a block or apparatus corresponds to a method step or feature of a method step. Similarly, aspects described in the context of a method may also represent a feature of a corresponding block or item or a corresponding apparatus. Some or all of the method steps may be performed by (or using) a hardware device, such as, for example, a microprocessor, a programmable computer, or an electronic circuit. In some embodiments, one or more of the most important method steps may be performed by such an apparatus.

In the forgoing, the present invention has been described with reference to the exemplary embodiment of the present invention, but those skilled in the art may appreciate that the present invention may be variously corrected and changed within the range without departing from the spirit and the area of the present invention described in the appending claims.

The invention claimed is:

1. A photovoltaic (PV) recombining apparatus configured to connect a PV system with a direct current (DC) bus connected to DC power lines of an energy storage system (ESS) and an inverter, the PV recombining apparatus comprising:
   the DC bus;
   an inverter connection terminal connecting the photovoltaic system and the inverter via the DC bus;
   an ESS connection terminal connecting the photovoltaic system and the energy storage system via the DC bus; and
   a disconnector configured to disconnect the photovoltaic system and the DC bus according to a control command which is based on external conditions,
   wherein the DC bus directly connects the inverter connection terminal, the ESS connection terminal and the disconnector to each other,
   wherein the photovoltaic system and the DC bus are connected in an instance that photovoltaic power generation is possible so that the energy management system operates in a first operation mode and the photovoltaic system and the DC bus is disconnected in an instance that photovoltaic power generation is impossible so that the energy management system operates in a second operation mode,
   wherein, in the first operation mode, the inverter supplies power according to maximum power point tracking (MPPT) control and the energy storage system performs charging in a constant power (CP) mode, and
   wherein, in the second operation mode, the energy storage system performs discharging in a constant voltage (CV) mode and the inverter supplies power in a constant power (CP) mode.

2. The PV recombining apparatus of claim 1, wherein the disconnector operates by receiving the control command which is based on the external conditions from a power management control device.

3. The PV recombining apparatus of claim 1, further comprising:
   a current monitoring device configured to measure an amount of power generated by the photovoltaic system; and
   a ground fault detector configured to detect a ground fault in the photovoltaic system.

4. The PV recombining apparatus of claim 1, wherein the ESS connection terminal is connected to a battery DC Panel (BDCP) of the energy storage system.

5. The PV recombining apparatus of claim 1, wherein the external conditions include one or more of time conditions and weather conditions related to availability of photovoltaic power generation.

6. The PV recombining apparatus of claim 5, wherein the external conditions include whether an operating time zone of the photovoltaic system is daytime or nighttime.

7. The PV recombining apparatus of claim 6, wherein the disconnector disconnects the photovoltaic system and the DC bus at night time.

8. The PV recombining apparatus of claim 1, further comprising an insulation monitoring device (IMD) configured to measure and monitor an insulation resistance value between a positive terminal of the PV system and a ground, and between a negative terminal of the PV system and the ground.

9. An energy management system comprising:
   a power management control device interworking with an energy storage system (ESS) and a photovoltaic (PV) system associated therewith and configured to determine whether the PV system is able to generate power based on external conditions; and
   a PV re-combiner configured to disconnect the photovoltaic system from a direct current (DC) bus which is connected to DC power lines of the energy storage system and an inverter according to a control command from the power management control device,
   wherein the PV re-combiner includes:
      an inverter connection terminal connecting the photovoltaic system and the inverter;

an ESS connection terminal connecting the photovoltaic system and the energy storage system; and a disconnector configured to disconnect the photovoltaic system and the DC bus according to the control command of the power management control device which is based on external conditions, and wherein the DC bus directly connects the inverter connection terminal, the ESS connection terminal and the disconnector to each other, wherein the photovoltaic system and the DC bus are connected in an instance that photovoltaic power generation is possible so that the energy management system operates in a first operation mode and the photovoltaic system and the DC bus is disconnected in an instance that photovoltaic power generation is impossible so that the energy management system operates in a second operation mode, wherein, in the first operation mode, the inverter supplies power according to maximum power point tracking (MPPT) control and the energy storage system performs charging in a constant power (CP) mode, and wherein, in the second operation mode, the energy storage system performs discharging in a constant voltage (CV) mode and the inverter supplies power in a constant power (CP) mode.

10. The energy management system of claim 9, wherein the PV re-combiner further includes:

a current monitoring device configured to measure an amount of power generated by the photovoltaic system; and a ground fault detector configured to detect a ground fault in the photovoltaic system.

11. The energy management system of claim 9, wherein the ESS connection terminal is connected to a battery DC Panel (BDCP) in the energy storage system.

12. The energy management system of claim 9, wherein the external conditions include one or more of time conditions and weather conditions related to availability of photovoltaic power generation.

13. The energy management system of claim 12, wherein the external conditions include whether an operating time zone of the photovoltaic system is daytime or nighttime.

14. The energy management system of claim 9, wherein the disconnector disconnects the photovoltaic system and the DC bus at nighttime.

15. A control method of an energy management system including an energy storage system (ESS) and a photovoltaic (PV) system associated therewith, the control method comprising:

determining whether the PV system is able to generate power, based on external conditions; and selectively connecting or disconnecting the photovoltaic system and a direct current (DC) bus according a determination result of the determining using a disconnector of a PV re-combiner which is located between the DC bus and the PV system, wherein the DC bus is connected to DC power lines of the ESS and an inverter, wherein the DC bus directly connects the inverter, the ESS and the disconnector to each other, wherein the selectively connecting or disconnecting the photovoltaic system and the DC bus further includes connecting the photovoltaic system and the DC bus in an instance that photovoltaic power generation is possible so that the energy management system operates in a first operation mode, wherein the selectively connecting or disconnecting the photovoltaic system and the DC bus includes disconnecting the photovoltaic system and the DC bus in an instance that photovoltaic power generation is impossible so that the energy management system operates in a second operation mode, wherein, in the first operation mode, the inverter supplies power according to maximum power point tracking (MPPT) control and the energy storage system performs charging in a constant power (CP) mode, wherein, in the second operation mode, the energy storage system performs discharging in a constant voltage (CV) mode and the inverter supplies power in a constant power (CP) mode.

* * * * *